United States Patent Office 3,412,082
Patented Nov. 19, 1968

3,412,082
ADENOSINE DERIVATIVES
Max Thiel and Kurt Stach, Mannheim, and Wolfgang Schaumann and Karl Dietmann, Mannheim-Waldhof, Germany, assignors to C. F. Boehringer & Soehne G.m.b.H., Mannheim-Waldhof, Germany, a corporation of Germany
No Drawing. Filed Oct. 11, 1966, Ser. No. 585,726
Claims priority, application Germany, Oct. 15, 1965, B 84,115
10 Claims. (Cl. 260—211.5)

ABSTRACT OF THE DISCLOSURE

Adenosine derivatives constituting highly effective cardiac and circulatory agents having the following formula:

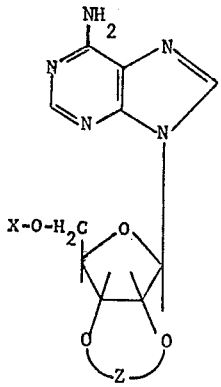

wherein X is hydrogen or acyl derived from a dibasic carboxylic acid such as succinic, glutanic and the like and Z is cycloalkylidene such as cyclohexylidene, cycloheptylidene, cyclooctylidene and the like where X is hydrogen or cycloalkylidene or benzylidene where X is acyl.

---

This invention relates to derivatives of adenosine, and is especially concerned with compounds of the foregoing type which have been found to be effective as cardiac and circulatory agents. More particularly, this invention deals with various adenosine derivatives, therapeutic compositions containing the same useful in the treatment of cardiac and circulatory disturbances and to a method for the treatment of such conditions.

In accordance with the present invention, there has now been discovered and synthesized a new group of compounds all possessing the following general formula

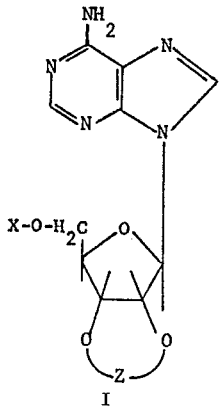

wherein X is a member selected from the group consisting of hydrogen and acyl derived from a dibasic carboxylic acid and Z is cycloalkylidene where X is hydrogen, and cycloalkylidene or benzylidene where X is acyl.

The new group of compounds includes ketal derivatives of the formula

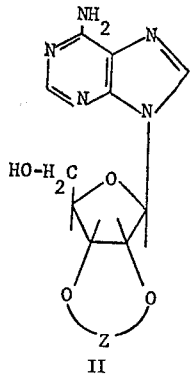

wherein Z is a cycloalkylidene group and reaction products of the ketal II wherein Z is either cycloalkylidene or benzylidene with a reactive derivative of a dibasic carboxylic acid, having the formula:

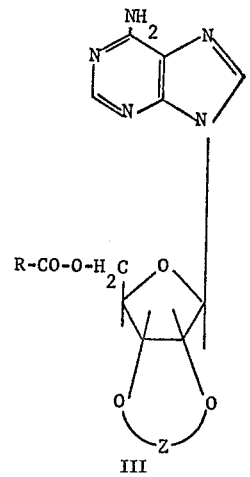

wherein Z is as above defined in I and R is a dibasic carboxylic acid group.

Another aspect of the present invention is concerned with the use of exo-benzylidene-adenosine and with pharmaceutical compositions containing this compound.

Adenosine, which is perhaps the most important member of the family of nucleosides, has the following structure:

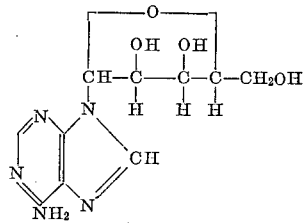

Exo-benzylidene-adenosine is a known compound which was first prepared by Hagget et al. (Chem. Ind., 1965, p. 136) by the separation of the isomeric mixture obtained by the acetalization of adenosine with benzaldehyde (see, for example, Michelson and Todd, J.C.S., 1949, p. 2476). The systematic chemical name for exo-benzylidene-adenosine is exo-2', 3'-O-benzylidene-adenosine (see J.C.S., 1950, 408 and 3299).

Although exo-benzylidene-adenosine is a comparatively simple chemical derivative of adenosine, pharmacologically it differs fundamentally from adenosine. Adenosine only results in a momentary dilation of the blood vessels, the heart minute volumes in narcotized animals remain substantially unchanged and the arterial blood pressure consequently falls.

As a result of detailed investigations, it has now been found that, although exo-benzylidene-adenosine does not produce a significant, direct, blood-vessel-dilating action, it acts primarily to increase the heart minute volume with the simultaneous participation of the heart beat volume.

It has now been found that when exo-benezylidene-adenosine is administered together with a cardiac-active glycoside, such as digoxin, there is obtained an additive action on the heart beat and heart minute volume.

Further, exo-benzylidene-adenosine not only increases the elimination of urine but also has a natriuretic action. This compound is effective enterally and its action has a remarkable duration.

Therefore, exo-benzylidene-adenosine can be regarded as being a circulatory stimulant. It gives rise to a general increase in blood circulation in the body and an excellent increase in the beat volume. In comparison with peripheral circulatory stimulants, it has the advantage that it does not cause a reduced circulation of blood in distal parts of the body by contraction of blood vessels. In contradistinction to the action of purely vasodilatory compounds, it does not cause a reduction in arterial pressure.

From a critical consideration of the pharmacodynamic actions of exo-benzylidene-adenosine, the compound appears to be useful for the following therapeutic indications:

(1) Cardiovascular circulatory insufficiencies with reduced heart minute volumes and forms of hypotonia caused by vegetative dysregulation;
(2) circulatory disturbances of, for example, the brain, kidneys and distal parts of the body, of organo-morphological origin; and
(3) cardiac insufficiencies, when administered with cardiac glycosides. In this case, the diuretic action can be particularly useful.

In the case of humans, exo-benzylidene-adenosine can be administered intravenously in an amount of from 50–100 mg. or can be administered orally in an amount of from 200–500 mg. When administered in the form of dosage units, such as dragees, which are soluble in the small intestine, the enteric effectiveness can be increased.

Still another aspect of the present invention is an improved process for the manufacture of the exo form of 2′,3′-O-benzylideneadenosine. This substance was first prepared by Bagget et al. (Chem. Ind. 1965, p. 136) by the separation of the isomer mixture which is obtained by the prior art acetalization of adenosine with benzaldehyde (cf., v.g., Michelson and Todd, J. Chem. Soc., 1949, p. 2476). The separation of the isomers was carried out by Bagget by repeatedly recrystallizing the mixture enriched with the exo form to the point of constant rotation. This method is very difficult and, in addition, results in only poor yields.

It has now been surprisingly found that the pure exo form of 2′,3′-O-benzylidendeadenosine, i.e., the isomer in which the benzyl proton is in the exo position away from the furan ring, can be obtained simply and with good yields by reacting adenosine in an inert solvent with an acetal of benzaldehyde at a temperature below 0° C. in the presence of a strong acid.

Suitable inert solvents include dioxane, dimethylformamide and dimethylsulfoxide. As acids, there can be used both mineral acids and strong organic acids such as trichloro acetic acid. It is advantageous to use a reaction temperature between —10 and 0° C., preferably a temperature of —5° C., because at higher temperatures undesirable side reactions occur and at lower temperatures the reaction is too slow.

Dimethylacetal or diethylacetal are used preferentially as the acetals of benzaldehyde.

The 2′,3′-O-benzylideneadenosine isomer prepared according to the invention is an intermediate in the production of the pharmacologically valuable derivatives of adenosine as set out in Formula I above. Furthermore, as heretofore noted, the 2′,3′-O-benzylideneadenosine compound can be used per se as a circulatory stimulant.

The novel compounds of the invention of Formula II where Z is a cycloalkylidene group are prepared by reacting adenosine with a cycloalkanone of the formula

wherein Z is a cyclo alkylidene group in the presence of an agent splitting off water.

As agents for splitting off water, there can be used all the agents usual in sugar chemistry for the preparation of cyclic ketals. However, it is preferable to work with zinc chloride according to the method of Levene and Tipson (see J. Biol. Chem., 121, 131, 1927) or with orthoformic acid esters and hydrogen chloride in an inert organic solvent according to the method of Chladek and Smart (Coll. comm. Czech., 28, 1301, 1963). In both cases, the desired products are obtained directly as colorless, crystalline powders.

The adenosine-ketals according to the present invention are valuable cardiac and circulatory agents which are especially indicated in the case of cardio-muscular failure, hypotonia and peripheral circulatory disturbances and which act by a mechanism which is different from that of previously known medicaments administered for this purpose.

The novel compounds of the invention of formula III are prepared by reacting a compound of Formula II wherein Z is cycloalkylidene or benzylidene with a reactive derivative of a dibasic carboxylic acid.

A preferred manner of carrying out the process according to the present invention is the esterification of the compounds of Formula II with an acid anhydride of a dicarboxylic acid in the presence of a base, particularly pyridine.

The new compound of Formula III according to the present invention can be converted, in the known manner, into their sodium and potassium salts, the salts being characterized by a good solubility in water.

The new adenosine derivatives according to the present invention of Formula III are valuable cardiac and circulatory agents and are particularly indicated in the case of cardio-muscular failure, hypotonia and peripheral circulatory disturbances producing their effect by a mechanism which is different from that of previously known medicaments administered for this purpose.

This invention is further illustrated by the following examples, which are not to be construed as imposing any limitations on the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

Example 1

30 g. benzaldehyde dimethylacetal were added to a suspension of 21 g. adenosine in 75 ml. dimethylformamide. The mixture was cooled to —5°, and 39 ml. of absolute dioxane which contained about 10% hydrogen chloride was added thereto. The resulting mixture was stirred at 0 to —5° C. until the solution had cleared, and then it was allowed to stand at —5° C. in a refrigerator for 4 to 5 days. The reaction mixture was then poured into soda soution and extracted with chloroform. The chloroform extract which was thereby obtained was dried over sodium sulfate and concentrated, and the residue freed of heavy volatile components in a high vacuum at about 50° C. The remaining residue was extracted with ether and then suction filtered. The crystals were recrystallized once out of hot ethanol. The yield amounted to 14.6 g. (52.5% of theory) of exo-2',3'-O-benzylidene-adenosine, M.P. 230–231° C. $[\alpha]_D^{20}$ —139°, NMR in DMSO: indication of exo-H 3.93 T.

The combined mother liquors could be concentrated by evaporation and saponified in the conventional manner with dilute sulfuric acid. The adenosine recovered in this manner could be used for the acetalization.

Example 2

2',3'-O-cyclohexylidene-adenosine

Variant (a).—700 ml. cyclohexanone and 140 g. anhydrous powdered zinc chloride were added successively to 50 g. adenosine. After stirring for one day, the reaction mixture was poured into a solution of 200 g. sodium carbonate in water. Following stirring for half an hour, the reaction mixture was filtered with suction, washed with water and the combined filtrates extracted several times with chloroform. The extract was concentrated, the unreacted cyclohexanone being recovered in the process. The evaporation residue was washed with ether and then filtered with suction. There were obtained 41.5 g. (64% of theory) 2',3' - O - cyclohexylidene-adenosine having a melting point of 185–186° C.

Variant (b).—A mixture of 10 g. adenosine, 33 ml. dimethylformamide, 10 ml. cyclohexanone and 21 ml. ethyl orthoformate was mixed, while stirring, with 17.8 ml. dioxane which contained about 2 g. hydrogen chloride. After a short time, a clear solution was obtained which was allowed to stand for about three days at room temperature until adenosine could no longer be detected chromatographically. The reaction mixture was then poured into a solution of ammonium bicarbonate in water, which was then extracted with chloroform, the chloroform solution dried and evaporated. The residue thereby obtained was triturated with ether. There were recovered 8 g. (61% of theory) 2',3'-O-cyclohexylidene-adenosine having a melting point of 185–186° C.

Example 3

2'-3'-O-cycloheptylidene-adenosine 21 g. (62% of theory) 2'-3'-O-cycloheptylidene-adenosine having a melting point of 185–186° C. were obtained, after working up in a manner analogous to that described in Example 1(a), from 25 g. adenosine, 70 g. zinc chloride and 300 ml. cycloheptanone.

Example 4

2'-3'-O-cyclooctylidene-adenosine

There were obtained, after working up in a manner analogous to that described in Example 1(a), from 25 g. adenosine, 70 g. zinc chloride and 300 ml. cyclooctanone, 12 g. (34% of theory) 2'-3'-O-cyclooctylidene-adenosine having a melting point of 195° C.

Example 5

2',3'-O-benzylidene-adenosine-5'-O-hemisuccinate

A mixture of 175 g. 2',3'-O-benzylidene-adenosine, 60 g. succinic anhydride and 1 liter pyridine was stirred at room temperature until a clear solution was obtained. This solution was left to stand for 5 days, then poured into a 2 N sodium carbonate solution, adjusted to pH 4 with glacial acetic acid and extracted with chloroform. The chloroform extract was shaken out with water and then evaporated in a vacuum. The residue was boiled with methanol, cooled and filtered off with suction. There were obtained 156.4 g. (70% of theory) 2',3'-O-benzylidene-adenosine-5'-O - hemisuccinate having a melting point of 178–181° C.

Example 6

2',3'-O-benzylidene-adenosine-5'-O-hemiglutarate

A mixture of 10 g. 2',3'-O-benzylidene-adenosine, 60 ml. pyridine and 3.9 g. glutaric anhydride was shaken for 7 days at room temperature. The mixture was then further worked up in a manner analogous to that described in Example 5. The residue thereby obtained was carefully washed with ether. There were obtained 3 g. (24% of theory) 2',3' - O - benzylidene - adenosine-5'-O-hemiglutarate having a melting point of 95–100° C.

Example 7

2',3'-O-cyclohexylidene-adenosine-5'-O-hemisuccinate

A mixture of 5 g. 2',3'-O-cyclohexylidene-adenosine, 28 ml. pyridine and 1.71 g. succinic anhydride was stirred for 5 days and then further worked up in the manner described in Example 5. The residue which was obtained by evaporation of the chloroform extract was triturated with ether. There were obtained 3.7 g. (58% of theory) 2',3'-O-cyclohexylidene-adenosine-5'-O-hemisuccinate having a melting point of 98–101° C.

The 2',3'-O-cyclohexylidene-adenosine used as starting material was prepared by the condensation of adenosine with cyclohexanone in the presence of an agent splitting off water according to the method of Leven and Tipson (see J. Biol. Chem., 121, 131, 1927) or alternatively by the method of Chladek and Smart (Coll. comm. Czech., 28, 1301, 1963). The 2',3'-O-cyclohexylidene-adenosine recovered had a melting point of 185–186° C.

Example 8

2',3'-O-cyclohexylidene-adenosine-5'-O-hemiglutarate 5 g. 2',3'-O-cyclohexylidene-adenosine in 28 ml. pyridine were mixed with 1.95 g. glutaric anyhdride. The reaction mixture was stirred for a total of 5 days until it had become homogeneous. The homogeneous reaction mixture was then poured into a solution of sodium carbonate and thereafter extracted with chloroform. Following working up in a manner analogous to that described in Example 5, there were obtained 4 g. (60% of theory) 2',3'-O-cyclohexylideneadenosine-5' - O - hemiglutarate having a melting point of 115–120° C.

Example 9

2',3'-O-benzylidene-adenosine-5' - O - hemicussinate (exo-from)

A mixture of 3.5 g. 2',3'-O-benzylideneadenosine (exo-form; melting point 230–231° C., $[\alpha]^{20}_D$—138°), 20 ml. dimethyl-formamide, 10 ml. triethylamine and 1.2 g. succinic anhydride was stirred for 1 hour at room temperature. A clear solution was obtained which then was left to stand for 3 days at room temperature. The solution was thereafter poured into a 2 N sodium carbonate solution and extracted with chloroform. The aqueous phase was acidified with acetic acid and again extracted with chloroform. The chloroform extract was evaporated using vacuum and the residue triturated with ether. There were obtained crystals, which were separated off with suction, boiled with methanol, cooled and again filtered off with suction. After washing the crystals with ether, there were obtained 3.2 g. (70% of theory) 2',3'-O-benzylideneadenosine-5' - O - hemisuccinate (exo-form) having a melting point of 185–186° C. [NMR-spectrum: exo-H $\delta$=6.07 p.p.m.].

A series of investigations with exo-benzylidene-adenosine as test compound have been carried out in order to demonstrate the therapeutic utility of this compound. The investigations and the results thereof follow:

(I) Action on the circulation.

(1) Action on blood pressure, amplitude frequency product and circulation of blood in rat kidney.

(a) Intravenous administration. The following procedures were carried out:

Method.—Measurement of the arterial pressure in the carotid artery using a Statham element and recording on a rapid recorder; determination of the heart frequency from the pulse rate; calculation of the product of the pulse amplitude by heart frequency as an approximate measure of the alteration of the heart minute volume; determination of the blood circulation in the kidney using a thermal conductive probe of the Hensel type (see Colenhofen, Hensel & Hildebrandt, Durchblutungsmessung mit Warmeleitelementen, Forschung und Klinik, pub. George Thieme-Verlag, Stuttgart, 1963).

Results.—As can be seen from Table 1, infusion of the test compound in the dosage indicated resulted in an increase of the arterial pressure and an increase of the heart frequency. Furthermore, there was calculated an increase in the amplitude frequency product as a measure of the heart minute volumes. Parallel with the increase of the heart minute volume, the circulation through the kidneys also increased. After 3 minutes' infusion, i.e., after 3 mg./kg., the action of the compound approached the optimum. 10–20 minutes after the infusion had been terminated, the action was still detected. (The values reported are average values and represent test data obtained in the number of experimental animals indicated.)

TABLE 1.—ACTION OF EXO-BENZYLIDENE-ADENOSINE ON THE CIRCULATION AND FLOW OF BLOOD THROUGH THE KIDNEYS IN NARCOTIZED RATS

[Average values from 6 test animals using rats under urethane narcosis. Dosage: 5 mg./kg. dissolved in a 5% glucose solution containing 10% dimethyl sulfoxide administered intravenously in 5 minutes]

|  | Initial value | After commencement of infusion | | After infusion ended (min.) | |
|---|---|---|---|---|---|
|  |  | 3 min. | 5 min. | 10 min. | 20 min. |
| $\bar{p}$ (mm. Hg) | 69 | 86 | 89 | 83 | 85 |
| $Fr_{cor}$ (min.$^{-1}$) | 240 | 305 | 357 | 284 | 290 |
| $\Delta p.Fr$ (.10$^{-2}$) | 120 | 171 | 202 | 173 | 168 |
| $\Delta\lambda$ (cal.$^{-1}$, cm.$^{-1}$, °C.$^{-1}$, 10$^{-4}$) (kidney) | 1.64 | 2.18 | 2.23 | 18.8 | 1.79 |

NOTES.—$\bar{p}$=Average arterial pressure calculated from: $\bar{p}=P_d+0.43.\Delta p$; $\Delta p.Fr$=Amplitude frequency product, approximate measure of the heart minute volume; $\Delta\lambda$=Thermal conductivity of the kidney tissue, difference from the dead value=measure of flow of blood through the tissue.

(b) Enteric administration.

Method.—As under (1a). In addition, a laparotomy was performed and the exit from the stomach ligatured, an injection catheter being inserted into the upper duodenum.

Results.—As can be seen from Table 2, following intraduodenal administration, a definite increase in the arterial pressure and an increase of the heart frequency was observed in only 3 minutes. The amplitude frequency product increased reaching a maximum 10 minutes after administration of the test compound. Parallel to this increase of the heart minute volume, a noticeably strong increase of circulation in the kidneys occurred.

TABLE 2.—ACTION OF EXO-BENZYLIDENE-ADENOSINE ON THE CIRCULATION AND FLOW OF BLOOD THROUGH THE KIDNEYS IN NARCOTIZED RATS

[Average values of 9 rats maintained under urethane narcosis. Dosage: 20 mg./kg. exo-benzylidene-adenosine in 1 ml. "tylose"[1] mucus/100 g. animal weight administered intraduodenally]

|  | Initial Value | Minutes after intraduodenal injection | | | |
|---|---|---|---|---|---|
|  |  | 3 | 6 | 10 | 20 |
| $\bar{p}$ | 68 | 93 | 91 | 88 | 79 |
| $Fr_{cor}$ | 289 | 326 | 365 | 386 | 368 |
| $\Delta p.Fr$ | 153 | 163 | 190 | 216 | 216 |
| $\Delta\lambda$ | 1.40 | 1.91 | 2.24 | 2.31 | 2.29 |

[1] Methylcellulose.

NOTE.—$\bar{p}$=Average arterial pressure calculated from: $\bar{p}=P_d+0.43.\Delta p$; $\Delta p.Fr$=Amplitude frequency product, approximate measure of the heart minute volume; $\Delta\lambda$=Thermal conductivity of the kidney tissue, difference from the dead value=measure of the flow of blood through the tissue.

(2) Circulatory action in guinea pigs.—(a) Circulatory action of exo-benzylidene-adenosine and subsequent administration of digoxin in guinea pigs with cardiac insufficiency.

Method.—The following procedures were carried out: Arterial pressure was measured in the femoral artery using a Statham strain gauge and by recording on a rapid recorder; electronic integration of the average arterial pressure; determination of the heart frequency from the pulse rate; determination of the heart minute volume by Fegler's cold dilution method (see Fegler, Quart. J. Exp. Physiol., 42, 254, 1957); and automatic determination of the temperature curve by means of an electronic integrator. The cardiac insufficiency was induced by the subsequent injection of a narcotic (sodium barbital). An adjustable cardiac insufficiency could be achieved by this subsequent injection; an immediate calculation of the heart minute volume using an integrator being carried out.

Results.—From Table 3 which follows it can be seen that with the infusion of exo-benzylidene-adenosine in the given dosage, the heart minute volume increased up to the tenth minute. The value attained up to this time corresponded approximately to the normal heart minute volume of narcotized guinea pigs. The average arterial pressure only changed insignificantly in the direction of a slight increase. In addition, the heart frequency increased very slightly. A decrease of the peripheral blood vessel resistance and an increase of the heart beat volumes were also observed. These circulatory changes could still be detected 4 minutes after the infusion had been completed.

If, after the administration of the exo-benzylidene-adenosine, digoxin was administered to the guinea pigs in the dosage shown in the table, then the heart minute volumes again increased to beyond the normal values. The average arterial pressure increased and the heart frequency was further increased. The peripheral resistance increased beyond the initial values and a further increase of the heart beat volume could also be calculated.

TABLE 3.—CIRCULATORY ACTION OF EXO-BENZYLIDENE-ADENOSINE AND SUBSEQUENT DIGOXIN ADMINISTRATION

Dossage:
1. Exo-benzylidene-adenosine, 2.5 mg./kg. total in 10 min. i.v.    1. Solvent DMSO 10%, Glucose 5% Infusion rate 0.1 ml./min.
2. Digoxin, 0.05 mg./kg./min. i.v.    2. Solvent DMSO 5%, Glucose 5% Infusion rate 0.05 ml./min.

[Average values (9 guinea pigs; Barbital narcosis)]

|  | Wt., g. | K, mean | Infusion exo-benzylidene-adenosine, min. | | | After infusion, min. | Plus Infusion of Digoxin, min. | | | | |
|---|---|---|---|---|---|---|---|---|---|---|---|
|  |  |  | 6 | 8 | 10 | 4 | 6 | 8 | 10 | 15 | 20 |
| $V_{aor}$ | 370 | 46.3 | 61.1 | 62.3 | 75.4 | 65.9 | 79.3 | 80.3 | 82.0 | 83.0 | 89.9 |
| $\bar{p}$ |  | 27 | 31 | 30 | 30 | 32 | 51 | 49 | 51 | 55 | 51 |
| $Fr_{cor}$ |  | 231 | 252 | 255 | 256 | 257 | 267 | 274 | 280 | 267 | 290 |
| $W$ |  | 583 | 507 | 482 | 427 | 486 | 643 | 610 | 622 | 663 | 568 |
| $V_{cor}$ |  | 0.201 | 0.242 | 0.244 | 0.294 | 0.256 | 0.297 | 0.293 | 0.293 | 0.311 | 0.310 |

NOTES.—$V_{aor}$=Heart minute volume (ml. mm.$^{-1}$); $\bar{p}$=Average arterial pressure (mm. Hg); $Fr_{cor}$=Heart frequency (min.$^{-1}$); W=Total peripheral resistance (mm. Hg 10$^2$)/ml. min.$^{-1}$; $V_{cor}$=Heart beat volume (ml.)= $V_{aor}/Fr_{cor}$; K=Initial values.

(b) Circulatory activity of exo-benzylidene-adenosine on narcotized guinea pigs following intraduodenal administration.

Method.—As under (2a): In addition, after laparotomy, the exit of the stomach was ligatured and an injection catheter inserted into the upper duodenum. Since, in the cardiac and circulatory insufficiency stage, the resorption of the test compound from the intestine is considerably impaired, the investigations were carried out on normal guinea pigs which had been narcotized with sodium barbital.

Results.—From Table 4, it can be seen that the action of the test compound on the circulation began only 4 minutes following the intraduodenal administration of exo-benzylidene-adenosine. It is recognized by an increase in the heart minute volume and of the heart frequency. An increase of the heart beat volume could also be calculated. Over the period of observation, the average arterial pressure remained substantially unchanged; a reduction in the peripheral resistance being calculated. The mentioned circulatory changes remained substantially unchanged 20 minutes following administration of the test compound.

TABLE 4.—CIRCULATORY ACTION OF EXO-BENZYL-IDENE-ADENOSINE ON GUINEA PIGS NARCOTIZED WITH SODIUM BARBITAL

[Average values of 8 test animals]
Dosage: 20.0 mg./kg. intraduodenal 5% glucose+10% DMSO.
Injection volumes: 1.0 ml./100 g. animal wt.

| | Wt., g. | K, mean | Minutes after injection | | | | | |
|---|---|---|---|---|---|---|---|---|
| | | | 4 | 6 | 8 | 10 | 15 | 20 |
| $V_{aor}$ | 369 | 80.9 | 97.0 | 100.4 | 104.7 | 107.8 | 93.5 | 102.8 |
| $\bar{P}$ | | 58 | 56 | 54 | 54 | 55 | 59 | 56 |
| $Fr_{cor}$ | | 257 | 277 | 281 | 284 | 288 | 294 | 290 |
| W | | 717 | 577 | 537 | 516 | 511 | 631 | 545 |
| $V_{cor}$ | | 0.315 | 0.351 | 0.358 | 0.368 | 0.374 | 0.318 | 0.354 |

NOTES.—$V_{aor}$=Heart minute volume (ml. min$^{-1}$); $\bar{p}$=average arterial pressure (mm. Hg); $Fr_{cor}$=Heart frequency (min.$^{-1}$); W=Total peripheral resistance ml. min.$^{-1}$/mm. Hg. 10$^2$ (3) Effect of exo-benzylidene-adenosine on the heart minute volume of non-narcotized dogs.

Method.—The following test procedures were carried out: Direct measurement of the heart minute volume in the ascending aorta by means of permanently implanted, electromagnetic flow probes in non-narcotized dogs. The measurement techniques used corresponded to the procedure described by Kolin and Kade (Proc. Nat. Acad. Sci., 45, 1312, 1959) and of Khouri and Gregg (J. Appl. Physiol., 18, 224, 1963). The electromagnetic transmitter was operatively implanted under aseptic conditions. The registering of the phasic flow, which was determined over the course of time, was carried out using a rapidly recording system. The beat volume was determined planimetrically from the phase-recorded flow curves and the frequency was counted from the phasic course of flow. Since an absolute calibration on non-narcotized animals is, for practical reasons, extraordinarily difficult, the alterations of the heart minute volume and of the heart beat volume are given in the table as percentages of the resting values.

Results.—From Table 5 it can be seen that 15 minutes after oral administration of the test compound, the first circulatory changes could be observed in the non-narcotized dogs. These changes are manifested by an increase in the heart minute volume and in the heart beat volume. The heart frequency remained unchanged over the entire period of observation. The increase in the heart minute volume reached a maximum 1–2 hours after administration of the test compound and after 2.5 hours only decreased. The same also applied to the heart beat volume.

TABLE 5.—CIRCULATORY EFFECTS OF EXO-BENZYLIDENE-ADENOSINE ON NON-NARCOTIZED DOGS

Administration: oral.
Dosage: 40 mg./kg. in 1 ml./kg. "tylose" [1] mucus.
Average values of 5 dogs.

| | Resting value | Minutes after administration of test compound | | | | | |
|---|---|---|---|---|---|---|---|
| | | 15 | 30 | 60 | 90 | 120 | 150 |
| $Fr_{cor}$ (min.$^{-1}$) | 58 | 57 | 51 | 52 | 56 | 52 | 56 |
| $V_{aor}$ (percent) | 100 | 113 | 116 | 121 | 120 | 132 | 115 |
| $V_{cor}$ (percent) | 100 | 114 | 131 | 135 | 124 | 147 | 119 |

[1] Methylcellulose.

(II) Action of exo-benzylidene-adenosine on the excretion of urine and electrolytes (1) Alteration of the excretion of urine and electrolytes in non-narcotized rats after parenteral enteric administration of exo-benzylidene-adenosine.

Method.—The following test procedures were carried out: 30 female rats were employed for each dosage rate and for the control experiment; the animals being divided into groups of five, were employed for each determination of the urine excretion using metabolic funnels, hourly urine fractionation, six hour experimental period; determination of the urine volume and of the sodium excretion, and measurement of the sodium content by flame-photometry. The animals used in the test experiment procedures had been fasted since the previous evening. The oral administration of the test compound was carried out using a stomach tube. The control animals received a corresponding amount of solvent.

Results.—From Table 6, it can be seen that following intraperitoneal administration of the test compound a dose-dependent increase of the urine and sodium excretion was observed in the non-narcotized rats. The natriuretic effect occurred even after a dose of only 2 mg./kg., an increase of the urine volume was found to have begun at a dosage between 4 and 8 mg./kg. On the basis of the course of the action, it could be concluded that with 20 mg./kg. intraperitoneally, there was achieved an optimum action on the increase of the urine excretion and on the sodium secretion.

From the course of the dosage action after oral administration of the test compound, it could be concluded that an increase of the urine and sodium secretion began after a dosage of 20–50 mg./kg.

Thus, after both intraperitoneal and oral administration, the urine excretion and also the sodium excretion increased in non-narcotized rats. The action on sodium excretion was the most strongly marked.

TABLE 6.—INCREASE OF THE URINE AND SODIUM EXCRETION ON NON-NARCOTIZED RATS AFTER INCREASING DOSES OF EXO-BENZYLIDENE-ADENOSINE (Average Values of 30 Animals Per Dosage Administered); Administration in 10 ml. 5% Dimethyl Sulphoxide Intraperitoneally or Orally)

| Administration | Dose, mg./kg | Total excretion after 6 hours | |
|---|---|---|---|
| | | Urine volume, ml./kg. | Na, $\mu$ equiv./ kg. |
| Intraperitoneal | (¹) | 7.5 | 95 |
| | 2 | 9.2 | 171 |
| | 4 | 10.4 | 183 |
| | 8 | 20.1 | 875 |
| | 12 | 27.4 | 1,800 |
| | 20 | 33.8 | 2,035 |
| Per os | (¹) | 15.1 | 420 |
| | 6 | 14.5 | 450 |
| | 12 | 17.0 | 566 |
| | 20 | 15.5 | 453 |
| | 50 | 23.9 | 1,103 |
| | 100 | 26.9 | 1,552 |

[1] Control.

(2) Action of exo-benzylidene-adenosine on urine and electrolyte diuresis in non-narcotized dogs.

Method.—Male dogs were used which had been fasted since the previous evening. A temporary catheter was installed and maintained in the bladder during the experimental period. Hourly collection of the urine and analysis of the volume and flame-photometric analysis of the sodium content were carried out. The test compound was administered intravenously or orally using a stomach tube.

Results.—As can be seen from Table 7, 5 mg./kg. exo-benzylidene-adenosine administered intravenously to non-narcotized dogs resulted in an increase, within the first hour, not only of the urine volume but also of the sodium excretion. In the second to third hours, a maximum was reached again for both the urine volume and the sodium excretion. In the fourth hour, the urine volume and the sodium concentration decreased considerably.

Following the oral administration of 50 mg./kg. exo-benzylidene-adenosine, an increase in the excretion of urine and sodium was observed two hours after administration of the test compound. An increase in the sodium secretion continued up to the fourth hour after administration of the test compound. It has to be assumed that the maximum natriuresis was still not reached after 4 hours.

on general animal experimental experience, the period of action is extraordinarily long, not only in the case of parenteral but also of enteral administration.

The compounds of the invention were evaluated as to their pharmacological effectiveness as cardiac and circulatory agents. The investigation established that all of the compounds of the invention had the desired activity in the narcotized experimental animals and that the compounds 2',3'-O-benzylidene-adenosine-5'-O-hemi-cussinate and 2',3'-O-cyclohexylidene-adenosine, evidenced particularly favorable activity. The test animals which were used were guinea pigs narcotized with barbiturates. The compounds in each instance evidenced the following pharmacological effects on the circulation:

(1) an increase in the heart minute volume, predominantly effected by an increase of the beat volume;

(2) parallel to the increase in the heart minute volume, a decrease in the flow resistance in the peripheral vessels;

(3) an increase of myocardium circulation; and (4) a slight central nervous stimulation which was manifested by a slight excitation of the respiratory center.

TABLE 7.—INCREASE OF URINE AND ELECTROLYSIS DIURESIS IN NON-NARCOTIZED DOGS AFTER ADMINISTRATION OF EXO-BENZYLIDENE-ADENOSINE (Average values for groups of 4 animals per control and per dose administered)

| Administration and dose | Ml./kg. urine volume, hours after administration | | | | $\mu$ equiv./mg. sodium excretion, hours after administration | | | |
|---|---|---|---|---|---|---|---|---|
| | 1 | 2 | 3 | 4 | 1 | 2 | 3 | 4 |
| Controls (1 ml./kg. 5% Glucose +10% DMSO) | 0.7 | 0.6 | 0.8 | 0.5 | 8.7 | 11.5 | 10.0 | 10.2 |
| 5 mg./kg. i.v. | 2.4 | 3.5 | 6.8 | 2.0 | 136.0 | 237.0 | 226.0 | 49.0 |
| Controls (1 ml. tylose mucus/kg | 1.6 | 1.3 | 0.6 | 1.4 | 20.0 | 11.0 | 5.0 | 18.0 |
| 50 mg./kg. oral | 1.1 | 2.8 | 2.8 | 2.8 | 19.0 | 57.0 | 90.0 | 119.0 |

The pharmacological evaluation of the cardiac and circulatory activity of exo-benzylidene-adenosine showed, in the case of all narcotized and non-narcotized experimental animals, a characteristic and marked action and, namely, an increase in the heart minute volume. In the case of rats and guinea pigs, this effect is brought about not only by an increase in frequency but also by an increase in beat volume. In rats, the arterial pressure increased volume passively. Under other experimental conditions (guinea pigs), the arterial blood pressure is kept constant by a pressure-passive reduction of the resistance of the peripheral blood vessels. The action of increasing the minute volume in guinea pigs with cardiac insufficiency is especially noticeable. The cardiac capacity reduced to the critical value is again normalized. The subsequent administration of digoxin brings about a further increase of this effect in the same experiments on guinea pigs. A clearly additive increase of the heart minute volume thereby results. In all the experiments, the participation of the heart beat volume is characteristic for the increase of the heart minute volume.

Parallelling this general increase in the heart minute volume, the flow of blood through the kidneys also increases considerably, as the results of the experimental work with the rats demonstrate. This finding is clearly correlated with the results of the investigations with respect to effect on diuresis. A dose-dependent increase of the excretion volume, especially on natriuresis, is observed not only in the case of rats but also in dogs. The causal connection of the blood flow through increasing and diuresis-promoting action of exo-benzylidene-adenosine does not exclude an inherent, specifically diuretic action.

As the experimental results indicate optimum circulatory action can be achieved with the parenteral administration of 2.5–5.0 mg./kg. of exo-benzylidene-adenosine. In the case of enteric administration, 20–50 mg./kg. have a comparable effect, the course of which is naturally determined by the slower resorption and distribution. The relative enteric effectiveness can be considered as more than 10%, especially when the results of the diuresis investigations are considered. Investigations on non-narcotized dogs, in particular, support this conclusion. Based The experimental data establish that the compounds of the invention and, in particular, 2',3'-O-benzylidene-adenosine-5'-O-hemi-succinate and 2',3'-O-cyclohexylidene-adenosine effected an increase in the heart action, an increase in the circulation, and a peripheral vascular dilation. In contrast to the conventional vascular dilating agents, however, the increase of a heart action is predominant so that the arterial blood pressure does not fall but, rather, increases.

The products of the invention, therefore, are indicated as therapeutic agents in the treatment of management of cardio-muscular failure, hypotonia and peripheral circulatory disturbances.

In the management of cardio-muscular failure, there has been exclusively used up to the present the cardiac glycosides. In contrast thereto, the products of the invention have the advantage that they are totally lacking in toxicity and, that, over the entire therapeutic range. The maximum effect of the cardiac glycosides can be intensified by concomitant use of the compounds of the invention. Thus, a qualitatively different area of application is made possible for the compounds of the invention.

In hypotonia sympathomimetic agents such as Effortil [1] or Novadral [2] have been conventionally used. These serve to increase the blood pressure by a peripheral vasoconstriction. The heart minute volume and, thus, the blood circulation in the organs at which the therapy is finally directed are primarily not increased. Contrastedly, the area of application of the compounds in accordance with the invention is at the heart. The compounds of the invention primarily increase the heart minute volume and thereby stimulate the blood circulation of the other organs. The blood pressure increases less markedly than with the known sympathomimetic agents so that the blood circulation of the organs is stimulated in a manner most economical to the heart.

Due to the primary increase in the blood circulation in the organs, the compounds according to the invention are not only suitable for the conditions as above set out but also lend themselves to the treatment of peripheral cir-

---

[1] d,l-1-(3'-hydroxyphenyl)-2-ethylaminoethanol-(1).
[2] d,l-1-(3'-hydroxyphenyl)-2-aminoethanol.

cularly disturbances. The commercially available drugs such as Dilatol [1] act to dilate the blood vessels whereby the heart minute volume is increased only secondarily. The blood vessel dilation naturally affects the healthy organs much more markedly than it does the diseased ones, which are no longer able or hardly able to dilate, i.e., the increased blood circulation predominantly affects the healthy vessel areas. In contrast, the compounds according to the invention as above set out primarily increase the heart minute volumes so that the increased blood circulation manifested is of equal benefit for all of the organs, including the diseased ones.

Particularly, the blood vessels of the brain are hardly affected by the known vaso-active substances as, for axample, vaso-dilators so that an increase of the blood circulation in the brain, particularly in those situations where a vascular sclerosis exists, can only be achieved by an increase of the heart minute volume, i.e., by the mechanism characteristic of the compounds in accordance with the invention.

Further experiments carried out with the compounds of the invention established that, contrary to most of the sympathomimetic agents, the compounds of the invention increase the kidney circulation simultaneously with the heart minute volume. This results in a noticeable increase in the excretion of sodium. This excretion of sodium has proved to be a very reliable criterion for evaluating the circulatory stimulating activity of the compounds of the invention. As compared to the known methods of evaluating the effect of a test compound on the circulation, the method where sodium excretion is used as a criterion has the further advantage that the experiments can be carried out on normal, i.e., non-narcotized animals for a prolonged period, and that only those compounds whose effects are manifested over a prolonged period are considered effective. This series of experiments was carried out with the following compounds:

(A) Isopropylidene-adenosine;
(B) d,l,-1-(3'-hydroxyphenyl)-2-ethylaminoethanol-(1);
(C) 2',3'-O-cyclohexylidene-adenosine-5'-O-hemi-succinate;
(D) 2',3'-O-benzylidene-adenosine-5'-O-hemiglutarate;
(E) 2',3'-O-benzylidene-adenosine-5'-O-hemi-succinate; (exo);
(F) 2',3'-O-cyclooctylidene-adenosine;
(G) 2',3'-O-cycloheptylidene-adenosine;
(H) 2',3'-O-cyclohexylidene-adenosine.

The experiments in the instant case were carried out on female rats. The urine was collected for 6 hours and analyzed for its content of sodium. The test substances were administered intraperitoneally and also orally in the form of their solutions in 5–10 ml./kg. of 5% glucose solution to which 5% dimethyl-sulfoxide had been added. In one series of the experiments (Method I), the animals were simultaneously given a fluid infusion of 40 ml./kg. isotonic glucose solution SC. In the other experiments (Method II), the fluid infusions were omitted. In evaluating the results, it has to be taken into account that in Method I the sodium excretion of the controls was substantially lower than that found in Method II. As comparison compound, the chemically similar isopropylidene-adenosine and Effortil were used.

Both comparison substances proved to be ineffective. 5 mg./kg. of Effortil (ethyladrianol) constitute excessively high dose levels using the intravenous route. When the control test compounds were injected intraperitoneally, the sodium excretion was not stimulated. The latter can be explained partly by the short period of effectiveness of the compounds and partly by their vaso-constrictor activity. The isopropylidene-adenosine compound similarly was not effective when 25 mg./kg. were given intraperitoneally and when 100 mg./kg. were given orally.

[1] 1-(p-hydroxyphenyl)-2-(1'-methyl-3'-phenylpropylamino)-propanol-(1).

The sodium excretion following the administration of 100 mg./kg. 2',3'-O-cyclohexylidene-adenosine-5'-O-hemisuccinate was three times higher than observed following the same dose of isopropylidene-adenosine. 2',3'-O-benzylidene - adenosine - 5' - O - hemiglutarate also markedly increased the sodium excretion while 2',3'-O-benzylidene-adenosine-5'-O-hemisuccinate had the strongest effect. The compounds 2',3'-O-cyclooctylidene-adenosine and 2',3'-O-cycloheptylidene-adenosine were markedly effective. In part, the increased effectiveness can be attributed to the higher sensitivity of the Method II employed.

The data are set out in the table which follows:

| Formula No. | Method | Substance [1] | Mg./kg. | Route of Administration | mVal Na kg., 6 hrs. |
|---|---|---|---|---|---|
| III | I | Control | | I.p. | 0.02 |
| | | B | 5 | I.p. | |
| | | A | 25 | I.p. | 0.01 |
| | | | 100 | Oral | 0.03 |
| | | C | 50 | do | 0.03 |
| | | | 100 | do | 0.09 |
| | | D | 25 | I.p. | 0.07 |
| | | E | 25 | I.p. | 0.4 |
| | I | Control | | I.p. | 0.02 |
| | | B | 5 | I.p. | |
| | | A | 25 | I.p. | 0.01 |
| | | | 100 | Oral | 0.03 |
| | | H | 25 | I.p. | 1.30 |
| II | | Control | | I.p. | 0.07 |
| | | B | 5 | I.p. | 0.09 |
| | | A | 25 | I.p. | 0.03 |
| | | F | 25 | I.p. | 3.2 |
| | | G | 25 | I.p. | 2.1 |

[1] See text beginning with line 37, column 13.

From the table and the other data reported above, it can be seen that the compounds of the invention constitute highly valuable therapeutic agents having a wide range of application.

As previously indicated, the adenosine derivative of this invention are readily adapted to therapeutic use as cardio and circulatory agents. The toxicity of the compounds of the invention has been found to be quite low or substantially non-existent when they are administered in amounts that are sufficient to achieve the desired therapeutic effects. Moreover, no other pharmacological side effects have been observed to occur as a result of their administration.

In accordance with the method of treatment of the present invention, the compounds can be given via the oral route. However, the compounds can also be administered as parenterals in the form of their solutions or suspensions. The compounds can be administered either alone and/or preferably in combination with a pharmaceutically acceptable carrier, and such administration can be carried out in both single and multiple dosages. More particularly, the compounds of this invention can be administered in a wide variety of different dosage forms wherein they are combined with various pharmaceutically acceptable inert carriers in the form of tablets, capsules, dragees, powders, aqueous suspensions, solutions, and the like. Such carriers include solid diluents or fillers, liquid aqueous media and various non-toxic organic solvents, etc. In general, the therapeutically effective compounds are present in such dosage forms at concentration levels ranging from about 0.01 to about 90% by weight of the total composition, i.e., in amounts which are sufficient to provide the desired unit dosage.

In dosage unit form, the compounds as set out herein are used in amounts of from 50–500 m. active ingredient per dosage unit. Preferably, the compositions are compounded so that for parenteral administration, 50–200 mg. of active compound/dosage unit is present and for oral administration 200–500 mg. of compound/dosage unit.

3,412,082

We claim:
1. A compound selected from the group consisting of adenosine derivatives of the formula:

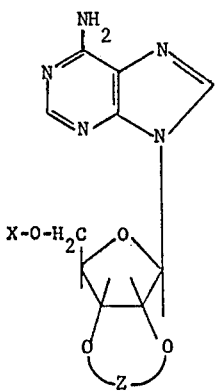

wherein X is a member selected from the group consisting of hydrogen, succinate and glutarate and Z is a member selected from the group consisting of cyclo-hexylidene, cycloheptylidene, and cyclooctylidene when X is hydrogen and is a member selected from the group consisting of cyclochexylidene, cycloheptylidene, cyclooctylidene and benzylidene when X is other than hydrogen, and the nontoxic alkali metal salts thereof.

2. A compound according to claim 1 having the formula:

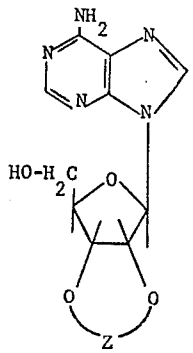

wherein Z is a member selected from the group consisting of cyclohexylidene, cycloheptylidene and cyclooctylidene.

3. A compound according to claim 1 having the formula:

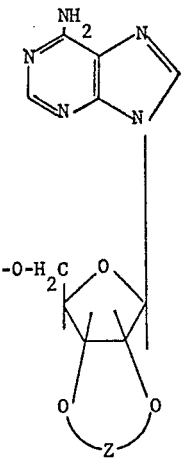

wherein R—CO— is a member selected from the group consisting of succinyl and glutaryl.

4. A compound according to claim 1 designated 2',3'-O-cyclohexylidene-adenosine.
5. A compound according to claim 1 designated 2',3'-O-cycloheptylidene-adenosine.
6. A compound according to claim 1 designated 2',3'-O-cyclooctylidene-adenosine.
7. A compound according to claim 1 designated 2',3' O-benzylidene-adenosine-5'-O-hemisuccinate.
8. A compound according to claim 1 designated 2',3'-O-benzylidene-adenosine-5'-O-hemiglutarate.
9. A compound according to claim 1 designated 2',3'-Q-cyclohexylidene-adenosine-5'-O-hemiglutarate.
10. A compound according to claim 1 designated 2',3'-O-benzylidene - adenosine-5'-O-hemisuccinate (exoform).

References Cited
UNITED STATES PATENTS
3,282,920  11/1966  Ouchi et al. _____ 260—211.5

OTHER REFERENCES
Michelson et al. "Jour. Chem. Soc." pp. 2476–2481, 1949, 260/211.5.
Brown et al. "Jour. Chem. Soc." pp. 3299–3304, 1950, 260/211.5.

LEWIS GOTTS, *Primary Examiner.*
JOHNNIE R. BROWN, *Assistant Examiner.*

UNITED STATES PATENT OFFICE
CERTIFICATE OF CORRECTION

Patent No. 3,412,082                                November 19, 1968

Max Thiel et al.

It is certified that error appears in the above identified patent and that said Letters Patent are hereby corrected as shown below:

In the heading to the printed specification, line 9, after "B 84,115" insert -- ; Oct. 16, 1965, B 84,139; May 6, 1966, B 87,010 --. Column 7, TABLE 1, fifth column, line 5 thereof, "18.8" should read -- 1.88 --. Column 9, footnote to TABLE 4, line 3 thereof, "ml. min.$^{-1}$/mm.Hg. $10^2$" should read $$\frac{mm\ Hg.\ 10^2}{ml.\ min.^{-1}}$$

Column 14, line 71, "50-500 m active ingredient" should read -- 50-500 mg. active ingredient --.

Signed and sealed this 10th day of March 1970.

(SEAL)
Attest:

EDWARD M. FLETCHER, JR.                    WILLIAM E. SCHUYLER, JR.
Attesting Officer                              Commissioner of Patents